United States Patent
Nakao et al.

(10) Patent No.: US 10,681,269 B2
(45) Date of Patent: Jun. 9, 2020

(54) COMPUTER-READABLE RECORDING MEDIUM, INFORMATION PROCESSING METHOD, AND INFORMATION PROCESSING APPARATUS

(71) Applicant: FUJITSU LIMITED, Kawasaki (JP)

(72) Inventors: Manabu Nakao, Kunitachi (JP); Moyuru Yamada, Machida (JP); Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 15/425,279

(22) Filed: Feb. 6, 2017

(65) Prior Publication Data

US 2017/0289447 A1   Oct. 5, 2017

(30) Foreign Application Priority Data

Mar. 31, 2016   (JP) .................. 2016-072795

(51) Int. Cl.
*G02B 15/14* (2006.01)
*H04N 5/232* (2006.01)
(Continued)

(52) U.S. Cl.
CPC ..... *H04N 5/23238* (2013.01); *G06K 9/00637* (2013.01); *G06K 9/209* (2013.01);
(Continued)

(58) Field of Classification Search
CPC . G06T 7/80; H04N 5/23238; G08B 13/19628
See application file for complete search history.

(56) References Cited

U.S. PATENT DOCUMENTS 6,639,596 B1 * 10/2003 Shum ............... G06K 9/209
                                              345/427
7,084,904 B2 * 8/2006 Liu ................. H04N 5/232
                                              348/218.1
(Continued)

FOREIGN PATENT DOCUMENTS

| JP | 2003-115057 | 4/2003 |
| JP | 2003-185589 | 7/2003 |
| JP | 2012-220471 | 11/2012 |

OTHER PUBLICATIONS

3-D scene data recovery using omni-directional multi-baseline stereo. International Journal of Computer Vision, S. B. Kang; 1997.*

(Continued)

*Primary Examiner* — Luis Perez-Fuentes

(57) ABSTRACT

A non-transitory computer-readable recording medium stores therein an information processing program that causes a computer to execute a process including: acquiring images photographed with a first angle of view and a second angle of view wider than the first angle of view; specifying a position and an attitude of a camera that photographed the image photographed with the first angle of view based on the image photographed with the second angle of view; stitching a plurality of images photographed with the first angle of view to generate a panoramic image; correcting the position on the generated panoramic image, of the image photographed with the first angle of view based on the specified position and attitude of the camera; and mapping the panoramic image to a three-dimensional model by texture mapping based on the corrected position.

9 Claims, 12 Drawing Sheets

(51) Int. Cl.

| | |
|---|---|
| *G06T 7/73* | (2017.01) |
| *G06K 9/20* | (2006.01) |
| *G06K 9/46* | (2006.01) |
| *G06T 3/40* | (2006.01) |
| *H04N 5/225* | (2006.01) |
| *G06T 7/80* | (2017.01) |
| *G06T 7/00* | (2017.01) |
| *G06K 9/00* | (2006.01) |
| *G06T 5/00* | (2006.01) |
| *G06T 7/60* | (2017.01) |
| *G06T 15/04* | (2011.01) |
| *G06T 19/20* | (2011.01) |

(52) U.S. Cl.
CPC .......... *G06K 9/4671* (2013.01); *G06T 3/4038* (2013.01); *G06T 5/006* (2013.01); *G06T 7/60* (2013.01); *G06T 7/74* (2017.01); *G06T 7/80* (2017.01); *G06T 7/97* (2017.01); *G06T 15/04* (2013.01); *G06T 19/20* (2013.01); *H04N 5/2258* (2013.01); *G06T 2207/10032* (2013.01); *G06T 2207/20212* (2013.01); *G06T 2207/30244* (2013.01)

(56) References Cited

U.S. PATENT DOCUMENTS

| | | | | | |
|---|---|---|---|---|---|
| 7,117,090 | B2* | 10/2006 | Haider | ............... | G06K 9/209 701/301 |
| 8,339,456 | B2* | 12/2012 | Eledath | ............... | G06K 9/209 348/154 |
| 8,482,595 | B2* | 7/2013 | Kweon | ............... | G03B 37/00 348/37 |
| 8,593,486 | B2* | 11/2013 | Kodaira | ............ | G06F 17/30271 345/629 |
| 8,798,451 | B1* | 8/2014 | Kweon | ............... | G03B 37/06 348/36 |
| 8,890,863 | B1* | 11/2014 | Lininger | ............... | G06T 15/04 345/419 |
| 8,893,026 | B2* | 11/2014 | Lindemann | ............ | G01C 11/02 348/36 |
| 10,032,306 | B2* | 7/2018 | Oh | ............... | G06T 13/80 |
| 2003/0071891 | A1* | 4/2003 | Geng | ............... | H04N 5/2259 348/39 |
| 2005/0207487 | A1* | 9/2005 | Monroe | ............ | G08B 13/19628 375/240.01 |
| 2006/0056056 | A1* | 3/2006 | Ahiska | ............ | G08B 13/19608 359/690 |
| 2006/0132482 | A1* | 6/2006 | Oh | ............... | G06T 13/80 345/419 |
| 2006/0203090 | A1* | 9/2006 | Wang | ............... | G06K 9/209 348/143 |
| 2010/0141767 | A1* | 6/2010 | Mohanty | ............ | G08B 13/19643 348/159 |
| 2011/0128385 | A1* | 6/2011 | Bedros | ............... | H04N 5/232 348/164 |
| 2011/0181689 | A1* | 7/2011 | Kweon | ............... | G03B 37/00 348/37 |
| 2011/0310219 | A1* | 12/2011 | Kim | ............... | G08B 13/19643 348/36 |
| 2014/0098185 | A1* | 4/2014 | Davari | ............... | H04N 5/23238 348/36 |
| 2014/0125654 | A1* | 5/2014 | Oh | ............... | G06T 17/00 345/419 |

OTHER PUBLICATIONS

3-D scene data recovery using omni-directional multi-baseline stereo. International Journal of Computer Vision, S. B. Kang; 1997. (Year: 1997).*
3-D scene data recovery using omni-directional multi-baseline stereo; Kang; 1997. (Year: 1997).*
NPL internet search; 2020; (Year: 2020).*
Projections for key point based registration of panoramic terrestrial 3D laser scan; 2015 (Year: 2015).*
Notice of Reasons for Refusal, dated Jan. 21, 2020, in Japanese Application No. 2016-072795 (6 pages).
Nagahara et al., "High-resolution Omnidirectional Panorama Imaging," Information Processing Society of Japan(IPSJ), IPSJ SIG Technical Reports, vol. 2005, No. 4, 2005-CVIM-147, PP. 163-170, Jan. 20, 2005.
Okada et al., "Generation of Virtualized Real-World based on Analysis of Mixed Media", Symposium, the Information Processing Society of Japan, Dec. 15, 2000, PP. 139-146.

* cited by examiner

FIG.5

| PHOTOGRAPHED TIME | IMAGE FILE NAME | FIRST CAMERA POSITION AND ATTITUDE | | | | | | RELIA-BILITY |
|---|---|---|---|---|---|---|---|---|
| | | X | Y | Z | ROLL | PITCH | YAW | |
| 2015/03/10 19:30:40.00 | c001.jpg | 10.1 | 0.0 | 1.0 | 0.0 | 0.3 | 0.2 | 0.9 |
| 2015/03/10 19:30:40.33 | c002.jpg | 10.1 | 0.0 | 1.2 | 0.1 | 0.2 | 0.2 | 0.8 |
| 2015/03/10 19:30:40.66 | c003.jpg | 10.1 | 0.0 | 1.4 | 0.1 | 0.2 | 0.2 | 0.5 |
| ... | ... | ... | ... | ... | ... | ... | ... | ... |

FIG.6

| PHOTOGRAPHED TIME | SECOND CAMERA POSITION AND ATTITUDE | | | | | | RELIA-BILITY |
|---|---|---|---|---|---|---|---|
| | X | Y | Z | ROLL | PITCH | YAW | |
| 2015/03/10 19:30:40.00 | 10.0 | 0.0 | 1.0 | 0.0 | 0.3 | 0.2 | 0.9 |
| 2015/03/10 19:30:40.33 | 10.0 | 0.0 | 1.2 | 0.1 | 0.2 | 0.2 | 0.8 |
| 2015/03/10 19:30:40.66 | 10.0 | 0.0 | 1.4 | 0.1 | 0.2 | 0.2 | 0.5 |
| ... | ... | ... | ... | ... | ... | ... | ... |

FIG.9

| COORDINATE IN PANORAMIC IMAGE | | THREE-DIMENSIONAL COORDINATE | | |
|---|---|---|---|---|
| HORIZONTAL COORDINATE | VERTICAL COORDINATE | X | Y | Z |
| 1000 | 6000 | 0.5 | 0 | 1.5 |
| 1000 | 1000 | 0.5 | 0 | 6.5 |
| 4000 | 1000 | 3.5 | 0 | 6.5 |
| 4000 | 6000 | 3.5 | 0 | 1.5 |

COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2016-072795, filed on Mar. 31, 2016, the entire contents of which are incorporated herein by reference.

FIELD

The embodiment discussed herein is related to an information processing program, an information processing method, and an information processing apparatus.

BACKGROUND

In recent years, although a lot of bridges constructed in the past have deteriorated, local self-governing bodies who manage bridges have a limited number of workers who examine bridges. Thus, the use of an unmanned aircraft (so-called drone) that flies via radio control to examine bridges has been proposed. Images photographed using an unmanned aircraft are converted to a panoramic image obtained by stitching a plurality of images, for example, and a bridge is evaluated using the panoramic image.

Moreover, a technique of performing alignment between an image obtained by photographing a wall surface of a tunnel and a plurality of measurement points on the wall surface obtained by measuring the wall surface of the tunnel using a laser scanner using the image and the coordinate values of the plurality of measurement points and the reflection intensity at the measurement points and drawing the image on an exploded plane of the tunnel is proposed.

Patent Document 1: Japanese Laid-open Patent Publication No. 2012-220471
Patent Document 2: Japanese Laid-open Patent Publication No. 2003-115057
Patent Document 3: Japanese Laid-open Patent Publication No. 2003-185589

However, in the examination of bridges using an unmanned aircraft, since a place where the sky is not open such as under a bridge girder is also imaged, a global positioning system (GPS) often does not work and it is difficult to measure a position and an attitude during imaging. Due to this, even when a panoramic image is generated based on photographed images and the generated panoramic image is attached to a three-dimensional model of a bridge, it is difficult to attach the panoramic image with high accuracy due to errors in the position and the attitude of the photographed images.

SUMMARY

According to an aspect of an embodiment, a non-transitory computer-readable recording medium stores therein an information processing program that causes a computer to execute a process including: acquiring images photographed with a first angle of view and a second angle of view wider than the first angle of view; specifying a position and an attitude of a camera that photographed the image photographed with the first angle of view based on the image photographed with the second angle of view; stitching a plurality of images photographed with the first angle of view to generate a panoramic image; correcting the position on the generated panoramic image, of the image photographed with the first angle of view based on the specified position and attitude of the camera; and mapping the panoramic image to a three-dimensional model by texture mapping based on the corrected position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a first position and attitude storage unit;
FIG. 6 is a diagram illustrating an example of a second position and attitude storage unit;
FIG. 9 is a diagram illustrating an example of a reference point information storage unit.

DESCRIPTION OF EMBODIMENT

Preferred embodiments of the present invention will be explained with reference to accompanying drawings. The disclosed technology is not limited to the present embodiment. Moreover, the embodiments described below may be combined appropriately within a range where no conflict occurs.

Figure 1:
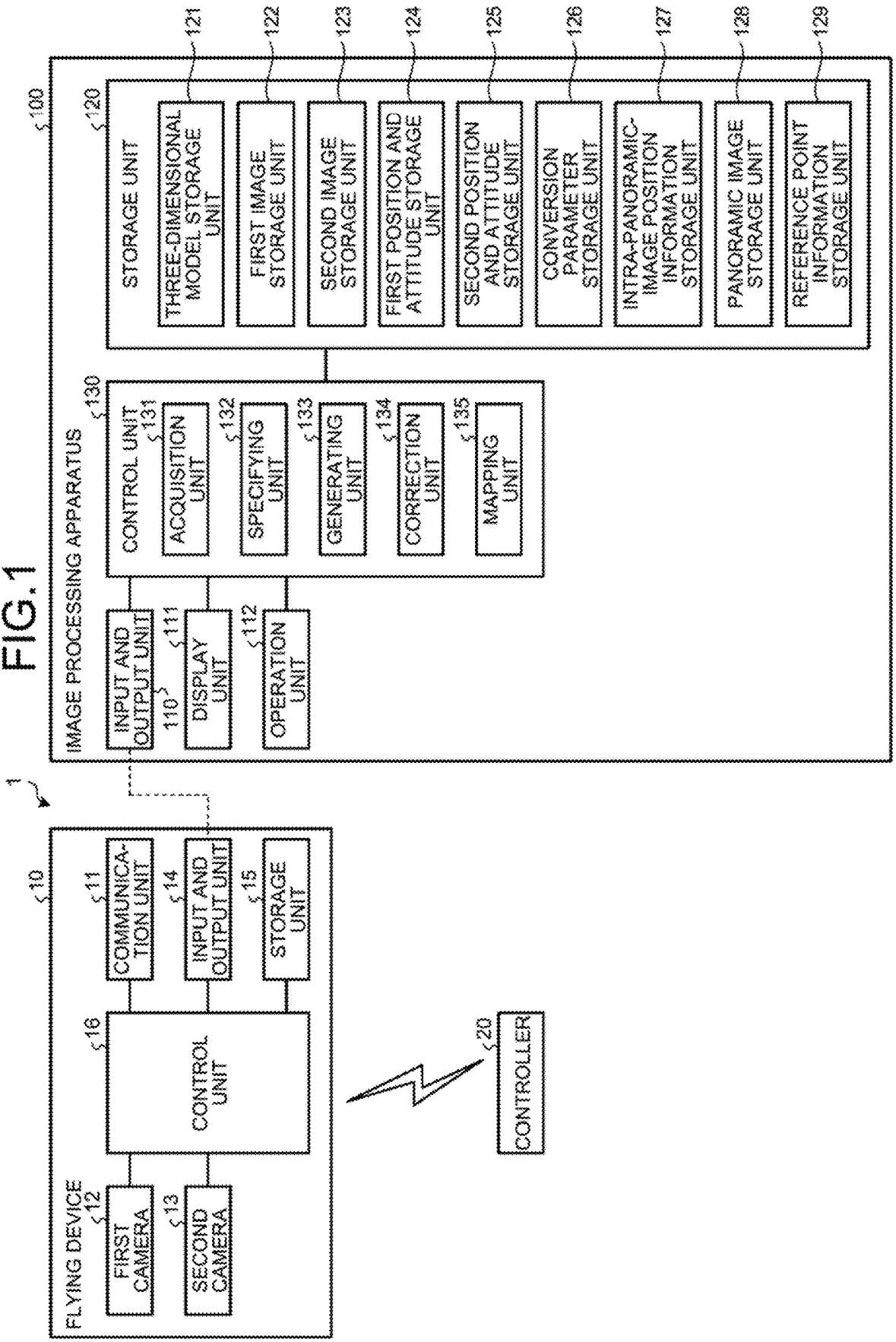
FIG. 1 is a block diagram illustrating an example of a configuration of an information processing system according to an embodiment.

FIG. 1 is a block diagram illustrating an example of a configuration of an information processing system according to an embodiment. An information processing system 1 illustrated in FIG. 1 includes a flying device 10, a controller 20, and an information processing apparatus 100. Although only one flying device 10 and only one controller 20 are illustrated in FIG. 1, the numbers of flying devices 10 and controllers 20 are not particularly limited and the information processing system 1 may include arbitrary numbers of flying devices 10 and controllers 20.

The flying device 10 is an unmanned aircraft that flies based on an operation command received from the controller 20. Moreover, the flying device 10 moves along a lower surface of a girder of a bridge which is an example of a structure or a wall surface of a pier, for example, in a state in which wheels for maintaining a distance from these surfaces are in contact with the surfaces. The flying device 10 photographs the surface of the structure using a first camera having a first angle of view and a second camera having a second angle of view wider than the first angle of view and stores the photographed images in a memory card, for example.

The controller 20 receives a user's operation and transmits an operation command to the flying device 10. The controller 20 is a proportional transmitter (so-called a propo) used for operating a radio-controlled unmanned aircraft. Moreover, the controller 20 may receive telemetry information transmitted from the flying device 10 and display the information.

The information processing apparatus 100 reads and acquires the photographed images stored in the memory card of the flying device 10. That is, the information processing apparatus 100 acquires images photographed with the first angle of view and the second angle of view wider than the first angle of view. The information processing apparatus 100 specifies the position and attitude of a camera that photographed the image photographed with the first angle of view based on the image photographed with the second angle of view. The information processing apparatus 100 generates a panoramic image by stitching a plurality of images photographed with the first angle of view. The information processing apparatus 100 corrects the position of the image photographed with the first angle of view on the generated panoramic image based on the specified position and attitude of the camera. The information processing apparatus 100 maps the panoramic image onto a three-dimensional model by texture mapping based on the corrected position of the image photographed with the first angle of view. In this way, the information processing apparatus 100 can attach high-definition images to a three-dimensional model with high accuracy.

Next, a configuration of the flying device 10 will be described. As illustrated in FIG. 1, the flying device 10 includes a communication unit 11, a first camera 12, a second camera 13, an input and output unit 14, a storage unit 15, and a control unit 16. Moreover, the flying device 10 is a multicopter having two wheels that make contact with the surface of a structure and a plurality of rotors generating thrust for flight. The flying device 10 can maintain a fixed distance from the surface of the structure due to the two wheels. The flying device 10 may include various functional units included in an existing computer, such as, for example, various display devices and various audio output devices in addition to the functional units illustrated in FIG. 1.

The communication unit 11 is implemented by a wireless device which uses a frequency band such as 40 MHz, 72 MHz, 73 MHz, or 2.4 GHz, for example. The communication unit 11 is a communication interface that is wirelessly connected to the controller 20 to communicate information with the controller 20. The communication unit 11 receives the operation command or the like transmitted from the controller 20 and outputs the operation command or the like to the control unit 16. Moreover, the communication unit 11 transmits the telemetry information or the like input from the control unit 16 to the controller 20.

The first camera 12 is provided in a predetermined front-rear direction of the flying device 10, for example, to photograph the surface of the structure. The first camera 12 photographs images using a complementary metal oxide semiconductor (CMOS) image sensor or a charge coupled device (CCD) image sensor as an imaging element, for example. The first camera 12 photoelectrically converts light received by the imaging element and performs analog/digital (A/D) conversion to generate images. The first camera 12 outputs the generated images to the control unit 16 together with the photographed time. The first camera 12 outputs the photographed images and the photographed time thereof to the control unit 16 at 3 frames/second, for example. The first camera 12 may be fixed in one direction and may be configured to change its direction.

The second camera 13 is an omnidirectional camera provided above the flying device 10, for example, and photographs the surroundings including the structure. The second camera 13 photographs images using a CMOS image sensor or a CCD image sensor as an imaging element, for example. The second camera 13 photoelectrically converts light received by the imaging element and performs A/D conversion to generate images. The second camera 13 outputs the generated images to the control unit 16 together with the photographed time. The second camera 13 outputs the photographed images and the photographed time thereof to the control unit 16 at three frames/second, for example. In the following description, the image photographed by the first camera 12 is referred to as a first image and the image photographed by the second camera 13 is referred to as a second image.

Figure 2:
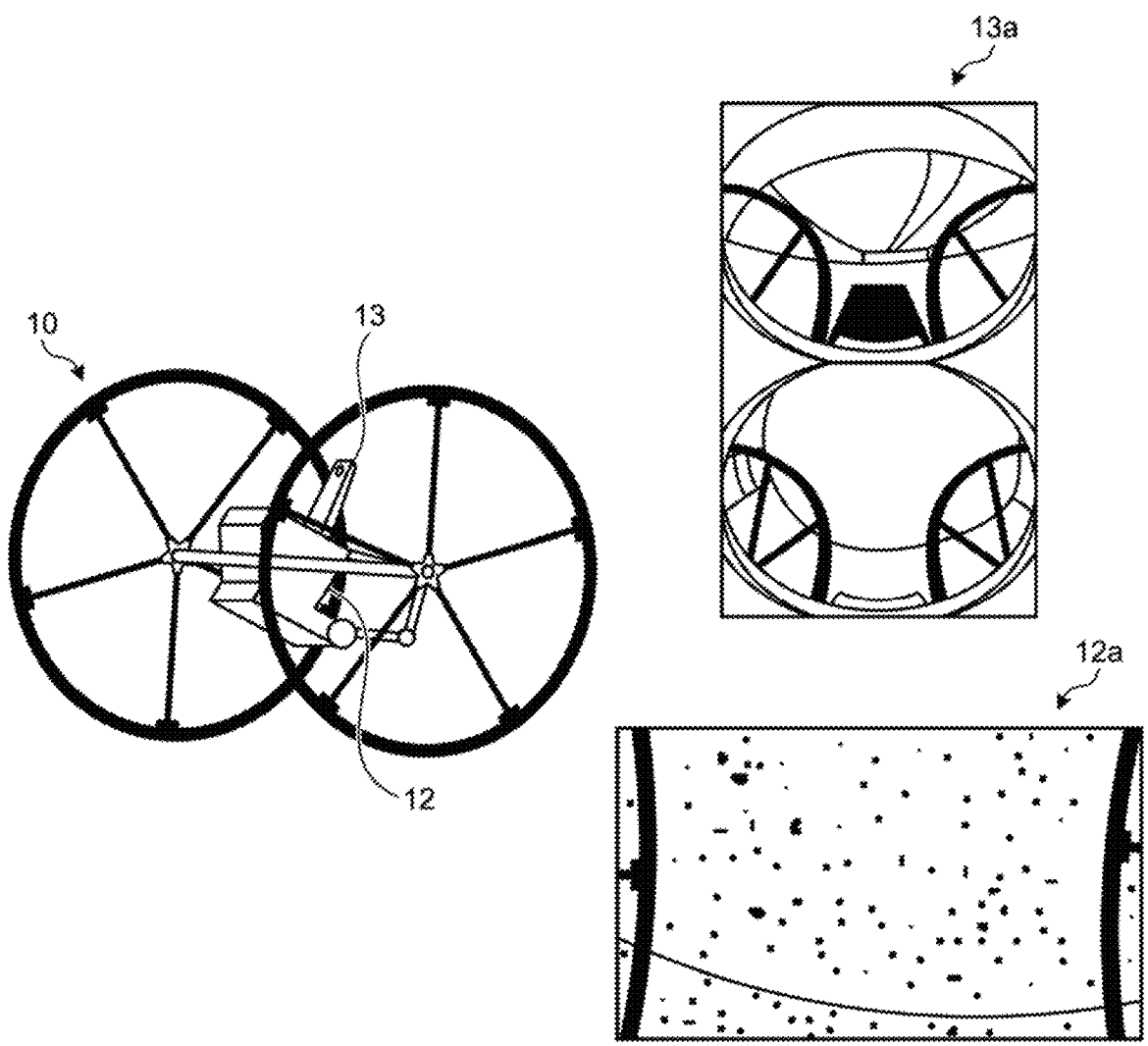
FIG. 2 is a diagram illustrating an example of a flying device and a photographed image.

Here, the flying device 10 and the photographed image will be described with reference to FIG. 2. FIG. 2 is a diagram illustrating an example of the flying device and the photographed image. As illustrated in FIG. 2, the flying device 10 has the first camera 12 and the second camera 13 provided on a main body thereof. A first image 12a photographed by the first camera 12 is an image obtained by photographing the surface of a pier at a proximity thereof, for example, and is a high-definition image in which cracks as small as approximately 0.1 mm, for example, can be identified. Moreover, the first image 12a is a 2 K image such as a Full-HD image obtained by photographing a range of approximately 0.8 m by 0.6 m of a pier at a photographing distance of approximately 40 cm, for example. The first image 12a may be an image of which the number of pixels is larger such as a 4 K image depending on a photographing distance.

Since a second image 13a photographed by the second camera 13 is photographed by an omnidirectional camera, the second image 13a is a wide-viewing-angle image and is an image which includes an end of the pier at the proximity of the flying device 10, for example. That is, the second image 13a is an image with which the position of the flying device 10 can be estimated based on a feature point of the photographed structure. Damages such as cracks in a bridge can be examined by visualizing the damages three-dimensionally. The three-dimensional visualization to be used for examination can be realized by attaching a panoramic image obtained by stitching a plurality of first images 12a so that an entire crack can be seen in a bird's-eye view to a three-dimensional model of a bridge or the like. When a panoramic image is to be attached to a three-dimensional model, it is needed to estimate the position of the panoramic image in the three-dimensional model. Thus, the second image 13a photographed together with the first image 12a is used for estimating the position of the flying device 10.

Returning to FIG. 1, the input and output unit 14 is a memory card reader/writer (R/W). The input and output unit 14 stores the first image and the photographed time thereof and the second image and the photographed time thereof output from the control unit 16 in a memory card. A SD memory card or the like, for example, can be used as the memory card. Moreover, the input and output unit 14 reads the information to be used by the control unit 16, stored in the memory card and outputs the information to the control unit 16.

The storage unit 15 is implemented by a semiconductor memory element such as a random access memory (RAM) or a flash memory or a storage device such as a hard disk or an optical disc, for example. Moreover, the storage unit 15 temporarily stores the images photographed by the first and second cameras 12 and 13 and stores information to be used for processing by the control unit 16.

The control unit 16 is implemented by a central processing unit (CPU) or a micro processing unit (MPU), for example, in such a way that the CPU or the MPU executes a program stored in an internal storage device using a RAM as a work area. Moreover, the control unit 16 may be implemented by an integrated circuit such as an application specific integrated circuit (ASIC) or a field programmable gate array (FPGA), for example. The control unit 16 controls the entire flying device 10.

The control unit 16 controls a rotor or the like (not illustrated) to control the flight of the flying device 10 according to the operation command received from the controller 20 via the communication unit 11. Moreover, the control unit 16 transmits telemetry information associated with the flight of the flying device 10 to the controller 20 via the communication unit 11.

When an image and photographed time are input from the first camera 12, the control unit 16 stores the input image and photographed time in a memory card of the input and output unit 14 as the first image and the photographed time thereof. Moreover, when an image and photographed time are input from the second camera 13, the control unit 16 stores the input image and photographed time in the memory card of the input and output unit 14 as the second image and the photographed time thereof. When storage in the memory card of the input and output unit 14 is slow, the control unit 16 may temporarily store the first image and the photographed time thereof and the second image and the photographed time thereof in the storage unit 15.

Next, a configuration of the information processing apparatus 100 will be described. As illustrated in FIG. 1, the information processing apparatus 100 includes an input and output unit 110, a display unit 111, an operation unit 112, a storage unit 120, and a control unit 130. The information processing apparatus 100 may include various functional units included in an existing computer, such as, for example, various input devices and various audio output devices in addition to the functional units illustrated in FIG. 1. A stationary personal computer can be used as an example of the information processing apparatus 100. The information processing apparatus 100 is not limited to the stationary personal computer and a portable personal computer may be used as the information processing apparatus 100. Moreover, a tablet terminal, for example, can be also used as the information processing apparatus 100 as the portable terminal in addition to the portable personal computer.

The input and output unit 110 is a memory card R/W, for example. The input and output unit 110 reads the first image and the photographed time thereof and the second image and the photographed time thereof stored in the memory card and outputs the same to the control unit 130. Moreover, the input and output unit 110 stores three-dimensional model data with texture output from the control unit 130 in the memory card. A SD memory card or the like, for example, can be used as the memory card.

The display unit 111 is a display device for displaying various types of information. The display unit 111 is implemented by a liquid crystal display as a display device, for example. The display unit 111 displays various screens such as a display screen input from the control unit 130.

The operation unit 112 is an input device that receives various operations from the user of the information processing apparatus 100. The operation unit 112 is implemented by a keyboard, a mouse, or the like as the input device, for example. The operation unit 112 outputs the operation input by the user to the control unit 130 as operation information. The operation unit 112 may be implemented by a touch panel as the input device, and the display device of the display unit 111 may be integrated with the input device of the operation unit 112.

The storage unit 120 is implemented by a semiconductor memory element such as a RAM or a flash memory or a storage device such as a hard disk or an optical disc, for example. The storage unit 120 includes a three-dimensional model storage unit 121, a first image storage unit 122, a second image storage unit 123, a first position and attitude storage unit 124, and a second position and attitude storage unit 125. Moreover, the storage unit 120 includes a conversion parameter storage unit 126, an intra-panoramic-image position information storage unit 127, a panoramic image storage unit 128, and a reference point information storage unit 129. Furthermore, the storage unit 120 stores information to be used for processing by the control unit 130.

The three-dimensional model storage unit 121 stores a three-dimensional model of a photographic target structure (for example, a bridge). Examples of the three-dimensional model which can be used include a three-dimension computer aided design (3D CAD) model used at the time of designing a bridge and a three-dimensional model generated based on three-dimensional shape data obtained by measuring a bridge using a laser scanner or the like. A three-dimensional model of a photographic target structure is stored in advance in the three-dimensional model storage unit 121 by the user's operation, for example.

Figure 3:
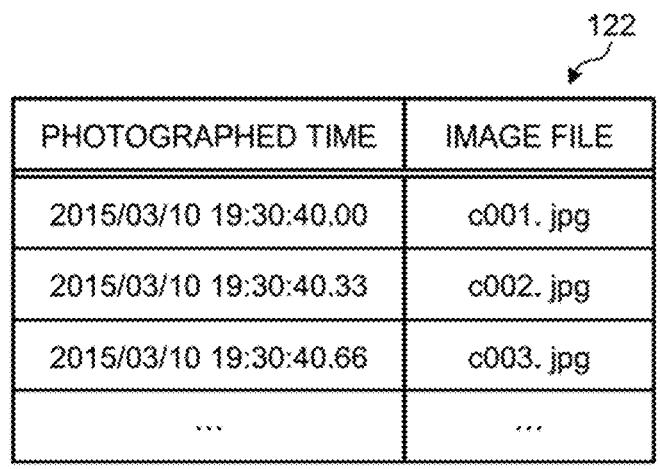
FIG. 3 is a diagram illustrating an example of a first image storage unit.

The first image storage unit 122 stores the first image photographed by the first camera 12 of the flying device 10 in correlation with the photographed time thereof. FIG. 3 is a diagram illustrating an example of the first image storage unit. As illustrated in FIG. 3, the first image storage unit 122 has items including "photographed time" and "image file". The first image storage unit 122 stores information as one record for each photographed time, for example.

The "photographed time" is information indicating the time at which the first image is photographed. The "photographed time" is recorded in millisecond units, for example so that the photographed time can be identified when the photographing interval is smaller than one second. The "image file" is information indicating an image file of the first image. In the example of FIG. 3, an image file name is illustrated for the sake of description.

Figure 4:
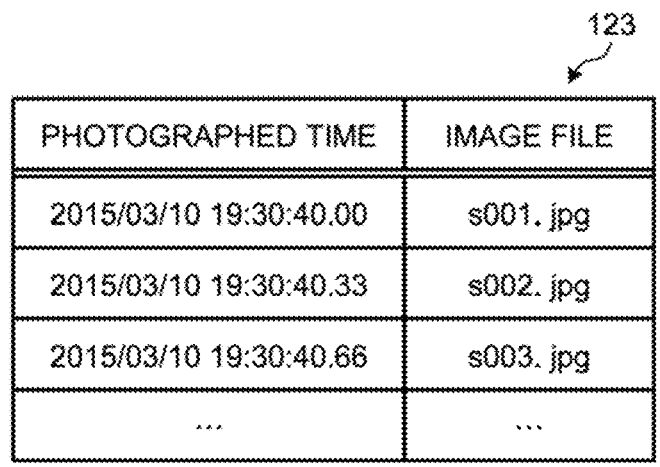
FIG. 4 is a diagram illustrating an example of a second image storage unit.

Returning to FIG. 1, the second image storage unit 123 stores the second image photographed by the second camera 13 of the flying device 10 in correlation with the photographed time thereof. FIG. 4 is a diagram illustrating an example of the second image storage unit. As illustrated in FIG. 4, the second image storage unit 123 has items including "photographed time" and "image file". The second image storage unit 123 stores information as one record for each photographed time, for example.

The "photographed time" is information indicating the time at which the second image is photographed. The "photographed time" is recorded in millisecond units, for example so that the photographed time can be identified when the photographing interval is smaller than one second similarly to the first image storage unit 122. The "image file" is information indicating an image file of the second image. In the example of FIG. 4, an image file name is illustrated for the sake of description.

Returning to FIG. 1, the first position and attitude storage unit 124 stores the position and attitude of the first camera 12 with which the first image is photographed in correlation with the photographed time and the image file name of the first image. FIG. 5 is a diagram illustrating an example of the first position and attitude storage unit. As illustrated in FIG. 5, the first position and attitude storage unit 124 has items including "photographed time," "image file name," "first camera position and attitude," and "reliability". Moreover, the "first camera position and attitude" indicates the position and attitude of the first camera 12 specified based on the second image and has items including "X," "Y," "Z," "Roll," "Pitch," and "Yaw". The first position and attitude storage unit 124 stores information as one record for each photographed time, for example.

The "photographed time" is information indicating the time at which the first image is photographed. The "image file name" is information indicating an image file name of the first image stored in the first image storage unit 122. "X" is information indicating the X-axis position of the first camera 12. "Y" is information indicating the Y-axis position of the first camera 12. "Z" is information indicating the Z-axis position of the first camera 12. "Roll" is information indicating a roll attitude (rotation in relation to a front-rear axis) of the first camera 12. "Pitch" is information indicating a pitch attitude (rotation in relation to a left-right axis) of the first camera 12. "Yaw" is information indicating a yaw attitude (rotation in relation to an up-down axis) of the first camera 12. "Reliability" is information indicating the reliability of an estimated value of the position and attitude of the first camera 12 based on the feature point of the second image photographed by the second camera 13.

Returning to FIG. 1, the second position and attitude storage unit 125 stores the position and attitude of the second camera 13 with which the second image is photographed in correlation with the photographed time of the second image. FIG. 6 is a diagram illustrating an example of the second position and attitude storage unit. As illustrated in FIG. 6, the second position and attitude storage unit 125 has items including "photographed time," "second camera position and attitude," and "reliability". Moreover, the "second camera position and attitude" indicates the position and attitude of the second camera 13 specified based on the second image and has items including "X," "Y," "Z," "Roll," "Pitch," and "Yaw". The second position and attitude storage unit 125 stores information as one record for each photographed time, for example.

The "photographed time" is information indicating the time at which the second image is photographed. "X" is information indicating the X-axis position of the second camera 13. "Y" is information indicating the Y-axis position of the second camera 13. "Z" is information indicating the Z-axis position of the second camera 13. "Roll" is information indicating a roll attitude (rotation in relation to a front-rear axis) of the second camera 13. "Pitch" is information indicating a pitch attitude (rotation in relation to a left-right axis) of the second camera 13. "Yaw" is information indicating a yaw attitude (rotation in relation to an up-down axis) of the second camera 13. "Reliability" is information indicating the reliability of an estimated value of the position and attitude of the second camera 13 based on the feature point of the second image photographed by the second camera 13.

Figure 7:
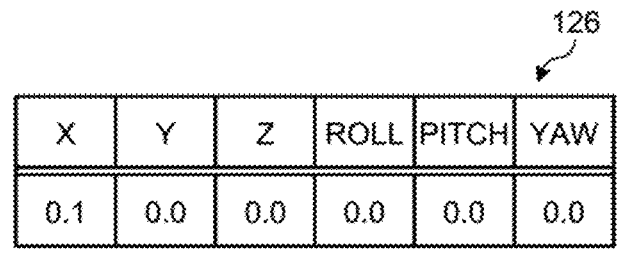
FIG. 7 is a diagram illustrating an example of a conversion parameter storage unit.

Returning to FIG. 1, the conversion parameter storage unit 126 stores a conversion parameter for converting the position and attitude of the second camera 13 to the position and attitude of the first camera 12. FIG. 7 is a diagram illustrating an example of a conversion parameter storage unit. As illustrated in FIG. 7, the conversion parameter storage unit 126 has items including "X," "Y," "Z," "Roll," "Pitch," and "Yaw".

"X" is information indicating a conversion parameter for the X-axis. "Y" is information indicating a conversion parameter for the Y-axis. "Z" is information indicating a conversion parameter for the Z-axis. "Roll" is information indicating a conversion parameter for roll. "Pitch" is information indicating a conversion parameter for pitch. "Yaw" is information indicating a conversion parameter for yaw.

Figure 8:
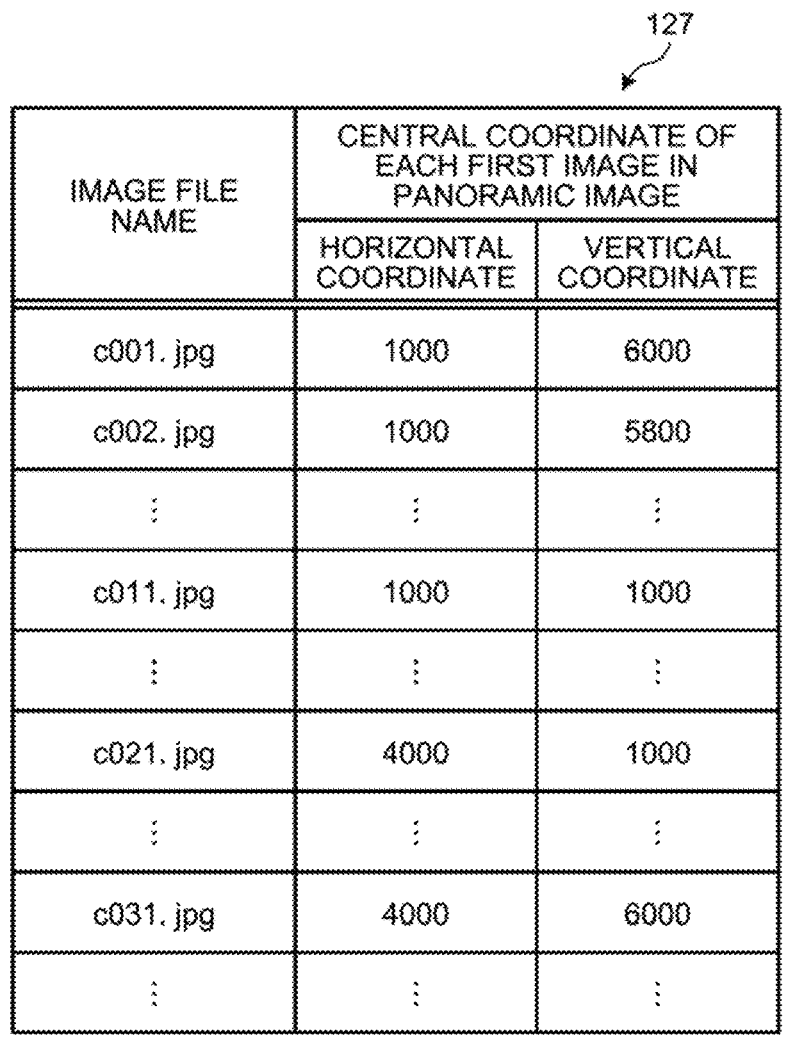
FIG. 8 is a diagram illustrating an example of an intra-panoramic-image position information storage unit.

Returning to FIG. 1, the intra-panoramic-image position information storage unit 127 stores a central coordinate of each first image in a panoramic image. FIG. 8 is a diagram illustrating an example of the intra-panoramic-image position information storage unit. As illustrated in FIG. 8, the intra-panoramic-image position information storage unit 127 has items including "image file name," "central coordinate of each first image in panoramic image". The "central coordinate of each first image in panoramic image" further has items including "horizontal coordinate" and "vertical coordinate".

The "image file name" is information indicating a file name of the first image. The "central coordinate of each first image in panoramic image" is information that represents the central coordinate of each first image in a panoramic image by a horizontal coordinate and a vertical coordinate.

Returning to FIG. 1, the panoramic image storage unit 128 stores the generated panoramic image. When the structure is a bridge, for example, panoramic images generated for respective surfaces of a pier are stored.

The reference point information storage unit 129 stores a coordinate in a three-dimensional model corresponding to the coordinate of a reference point defined in the panoramic image. FIG. 9 is a diagram illustrating an example of the reference point information storage unit. As illustrated in FIG. 9, the reference point information storage unit 129 has items including "coordinate in panoramic image" and "three-dimensional coordinate". Moreover, the "coordinate in panoramic image" has items including "horizontal coordinate" and "vertical coordinate". The "three-dimensional coordinate" has items including "X," "Y," and "Z".

The "coordinate in panoramic image" is information indicating the horizontal coordinate and the vertical coordinate of the first image corresponding to a reference point defined in the panoramic image. The "coordinate in panoramic image" is represented by the number of pixels in a horizontal or vertical direction of the panoramic image, for example. The "three-dimensional coordinate" is information that represents the coordinate in the three-dimensional model corresponding to the coordinate of a reference point defined in the panoramic image by X, Y, and Z-axes. The "three-dimensional coordinate" is represented by the length (for example, in meter units) in the directions of X, Y, and Z-axes of the three-dimensional model, for example.

Returning to FIG. 1, the control unit 130 is implemented by a CPU or a MPU, for example, in such a way that the CPU or the MPU executes a program stored in an internal storage device using a RAM as a work area. Moreover, the control unit 130 may be implemented by an integrated circuit such as an ASIC or a FPGA, for example. The control unit 130 includes an acquisition unit 131, a specifying unit 132, a generating unit 133, a correction unit 134, and a mapping unit 135, and implements or executes the function or effect of information processing to be described later. An internal configuration of the control unit 130 is not limited to the configuration illustrated in FIG. 1 but the control unit 130 may have another configuration as long as the control unit 130 performs information process to be described later.

The acquisition unit 131 receives the first image and the photographed time thereof and the second image and the photographed time thereof from the input and output unit 110. That is, the acquisition unit 131 acquires the first image and the photographed time thereof and the second image and the photographed time thereof. In other words, the acquisition unit 131 acquires images photographed with the first angle of view and the second angle of view wider than the first angle of view. The acquisition unit 131 stores the acquired first image and the photographed time thereof in the first image storage unit 122. Moreover, the acquisition unit 131 stores the acquired second image and the photographed time thereof in the second image storage unit 123.

The specifying unit 132 specifies the position and attitude of the first camera 12 with which the first image is photographed based on the second image and the photographed time thereof by referring to the three-dimensional model storage unit 121, the first image storage unit 122, and the second image storage unit 123. First, the specifying unit 132 estimates the position and attitude of the second camera 13 by executing a process of estimating self-position using the three-dimensional model and the second image, for example. Here, the self-position can be estimated using the technique disclosed, for example, in Ryuhei TENMOKU, and five others, "Estimation of the User's Position for Outdoor Mixed Reality Systems Using 3D Models and a Fisheye Camera," Proceedings of Image Recognition and Understanding Symposium (MIRU 2007), July, 2007, p. 1011-1016.

Moreover, the specifying unit 132 extracts feature points of the second image in relation to the estimated position and attitude of the second camera 13 and assigns reliability based on the extracted feature points. That is, the specifying unit 132 generates reliability corresponding to an estimation error. The specifying unit 132 increases the reliability when the estimation error is small and decreases the reliability when the estimation error is large, for example. The reliability is set between "0" and "1," for example, and "1" corresponds to largest reliability and "0" corresponds to smallest reliability. The specifying unit 132 stores the estimated position and attitude of the second camera 13 and the reliability thereof in the second position and attitude storage unit 125. The reliability is preferably not assigned if the position estimation accuracy is sufficient even when the reliability is not used.

Subsequently, the specifying unit 132 specifies the position and attitude of the first camera 12 and the reliability thereof by referring to the first image storage unit 122, the second position and attitude storage unit 125, and the conversion parameter storage unit 126. The specifying unit 132 specifies the photographed time of the second image which is closest to the photographed time of the first image. The specifying unit 132 applies the conversion parameters to the position and attitude of the second camera 13 corresponding to the specified photographed time of the second image and the reliability thereof to specify the position and attitude of the first camera 12 corresponding to the photographed time of the first image and the reliability thereof. The specifying unit 132 stores the specified position and attitude of the first camera 12 and the reliability thereof in the first position and attitude storage unit 124 in correlation with the photographed time and the image file name of the first image.

When the specifying unit 132 has finished specifying the position and attitude of the first camera 12 and the reliability thereof, the generating unit 133 stitches the first images by referring to the first image storage unit 122 to generate a panoramic image. Here, the panoramic image can be generated using the technique disclosed, for example, in Matthew Brown and one other, "Automatic Panoramic Image Stitching using Invariant Features", International Journal of Computer Vision 74:59, 2006. The generating unit 133 stores the generated panoramic image in the panoramic image storage unit 128.

Figure 10:
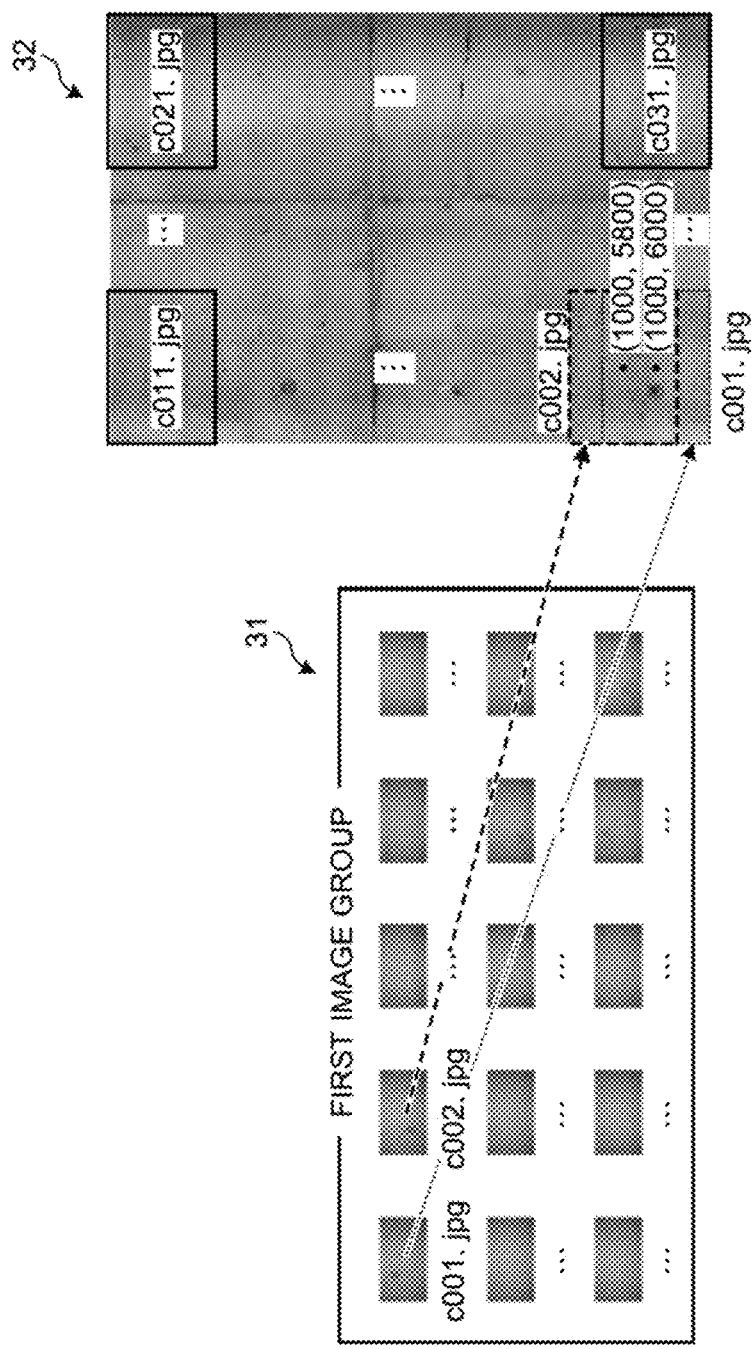
FIG. 10 is a diagram illustrating an example of how a panoramic image is generated.

Here, how the panoramic image is generated will be described with reference to FIG. 10. FIG. 10 is a diagram illustrating an example of how the panoramic image is generated. As illustrated in FIG. 10, the generating unit 133 reads a first image group 31 from the first image storage unit 122. The generating unit 133 generates a panoramic image 32 based on the respective first images of the first image group 31. The panoramic image 32 uses such a coordinate that a pixel at the top-left corner has a coordinate (horizontal coordinate, vertical coordinate)=(0, 0).

The generating unit 133 arranges a first image having the file name "c001.jpg," for example, at the bottom-left corner of the panoramic image 32. Moreover, the generating unit 133 arranges a first image having the file name "c002.jpg," for example, so as to be stitched with the first image "c001.jpg" in the panoramic image 32. In this manner, the generating unit 133 arranges other first images of the first image group 31 so as to be stitched together. In the example of FIG. 10, the first images at the four corners of the panoramic image 32 are "c011.jpg" at the top-left corner, "c021.jpg" at the top-right corner, "c001.jpg" at the bottom-left corner, and "c031.jpg" at the bottom-right corner.

The generating unit 133 generates a central coordinate (1000, 6000) of the first image "c001.jpg" in the panoramic image 32. Moreover, the generating unit 133 acquires a central coordinate (1000, 5800) of the first image "c002.jpg" in the panoramic image 32. In this manner, the generating unit 133 acquires the central coordinates of the respective first images of the first image group 31. The generating unit 133 stores the acquired central coordinate in the intra-panoramic-image position information storage unit 127 in correlation with the image file name of the first image.

Returning to FIG. 1, when the panoramic image is generated, the correction unit 134 selects a reference point to be used when attaching the panoramic image to a three-dimensional model. The correction unit 134 compares the central coordinates on the panoramic image, of the first images included in the panoramic image to extract the central coordinates of the first images positioned at the edges of the panoramic image as the reference points. The correction unit 134 may use the first images positioned at the four corners of the panoramic image, for example, as the first images positioned at the edges of the panoramic image.

Figure 11:
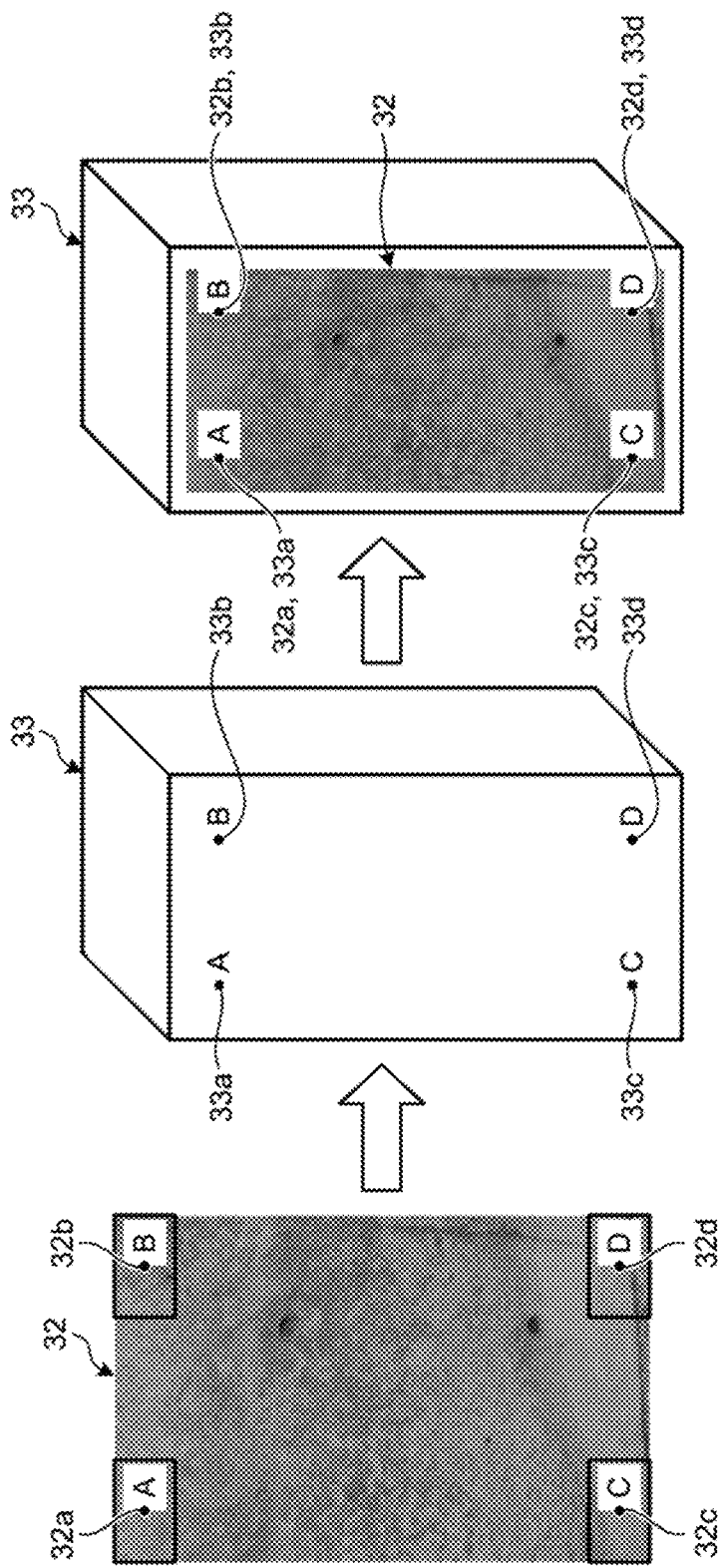
FIG. 11 is a diagram illustrating an example of texture mapping.

Here, the relation between the reference point and the texture mapping will be described with reference to FIG. 11. FIG. 11 is a diagram illustrating an example of texture mapping. As illustrated in FIG. 11, when the panoramic image 32 is to be attached to a three-dimensional model 33, the panoramic image 32 is corrected so that the respective coordinates correspond to each other. The example of FIG. 11 illustrates a case in which the central coordinates of the first images at the four corners of the panoramic image 32 are attached to the three-dimensional model 33 as reference points. The central coordinates of the first images at the four corners of the panoramic image 32 are central coordinates 32a, 32b, 32c, and 32d. Moreover, the reference points corresponding to the central coordinates 32a, 32b, 32c, and 32d are reference points A, B, C, and D.

The correction unit 134 corrects the positions of the first images on the panoramic image 32 so that the central coordinates 32a to 32d of the first images at the four corners of the panoramic image 32 overlap the coordinates 33a, 33b, 33c, and 33d corresponding to the reference points A to D in the three-dimensional model 33.

Specifically, the correction unit 134 extracts the smallest and largest values of the horizontal coordinate and the smallest and largest values of the vertical coordinate among the horizontal coordinates and the vertical coordinates included in the intra-panoramic-image position information by referring to the intra-panoramic-image position information storage unit 127. The correction unit 134 selects the central coordinate of the first image of which the central coordinate is closest to (smallest horizontal coordinate value, largest vertical coordinate value) as the reference point A.

Similarly, the correction unit 134 selects the central coordinate of the first image of which the central coordinate is closest to (largest horizontal coordinate value, largest vertical coordinate value) as the reference point B. The correction unit 134 selects the central coordinate of the first image of which the central coordinate is closest to (smallest horizontal coordinate value, smallest vertical coordinate value) as the reference point C. The correction unit 134 selects the central coordinate of the first image of which the central coordinate is closest to (largest horizontal coordinate value, smallest vertical coordinate value) as the reference point D.

The correction unit 134 acquires the central coordinates corresponding to the respective first images selected as the reference points A to D and the position and attitude of the first camera 12 by referring to the first position and attitude storage unit 124 and the intra-panoramic-image position information storage unit 127. The correction unit 134 corrects the coordinates to be used when attaching the reference points on the panoramic image to the surface of the three-dimensional model based on the acquired position and attitude of the first camera 12. The correction unit 134 stores the three-dimensional coordinates of the corrected reference points in the reference point information storage unit 129 in correlation with the coordinates in the panoramic image.

That is, the correction unit 134 corrects the position of the first image in the panoramic image by correcting the position of the extracted reference point. In other words, the correction unit 134 corrects the positions and scales of the respective first images in the panoramic image based on the positions of the reference points. The correction unit 134 may exclude the first images of which the reliability is smaller than a predetermined value (for example, 0.5) from choices using the reliability stored in the first position and attitude storage unit 124.

Figure 12:
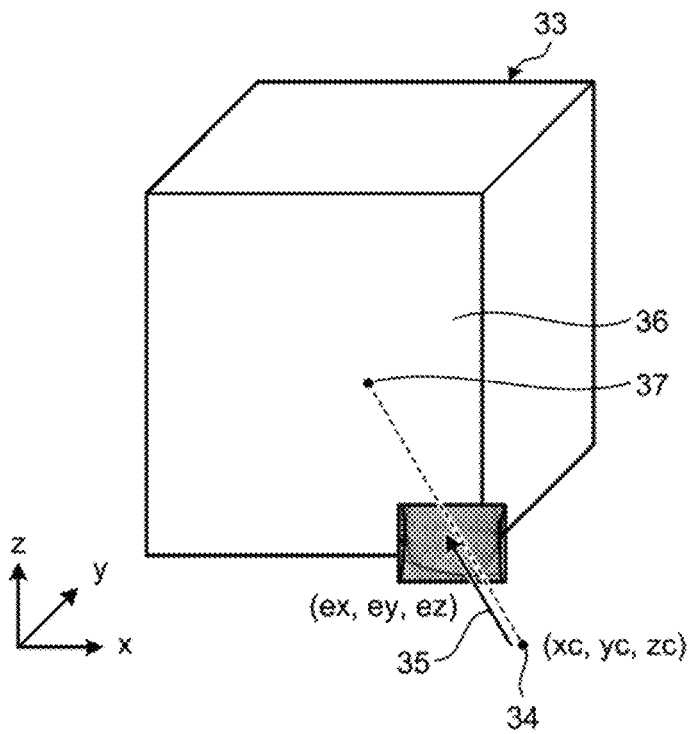
FIG. 12 is a diagram illustrating an example of correspondence between a reference point on a panoramic image and the surface of a three-dimensional model.

Here, how the coordinate to be used when attaching the reference point on the panoramic image to the surface of the three-dimensional model is corrected will be described with reference to FIG. 12. FIG. 12 is a diagram illustrating an example of correspondence between the reference point on the panoramic image and the surface of the three-dimensional model. In the example of FIG. 12, first, the correction unit 134 reads the position (xc, yc, zc) and attitude (Roll, Pitch, Yaw) of the first camera 12 corresponding to the first image of which a central coordinate 34 is the reference point from the first position and attitude storage unit 124. The correction unit 134 calculates a direction vector (ex, ey, ez) indicating a direction 35 of the first camera 12 from the attitude (Roll, Pitch, Yaw).

The correction unit 134 determines whether a straight line represented by Equation (1) below, corresponding to the direction vector (ex, ey, ez) that passes through the position (xc, yc, zc) crosses each surface that forms the three-dimensional model 33.

$$\begin{pmatrix} X \\ Y \\ Z \end{pmatrix} = \begin{pmatrix} xc \\ yc \\ zc \end{pmatrix} + t \begin{pmatrix} ex \\ ey \\ ez \end{pmatrix} * (t > 0) \qquad (1)$$

The correction unit 134 sets a point (that is, a point at which t in Equation (1) is minimized) closest to the position (xc, yc, zc) among the intersections between the surfaces and the straight line represented by Equation (1) to a position of the reference point on the three-dimensional model. That is, the correction unit 134 calculates a point 37 on a surface 36 of the three-dimensional model 33 as the position on the three-dimensional model, of the central coordinate 34 which is the reference point.

Returning to FIG. 1, the mapping unit 135 maps the panoramic image onto the three-dimensional model by texture mapping when the coordinates of the reference points in the panoramic image and the three-dimensional model are stored in the reference point information storage unit 129. The mapping unit 135 reads the three-dimensional model from the three-dimensional model storage unit 121. Moreover, the mapping unit 135 reads the panoramic image from the panoramic image storage unit 128. Moreover, the mapping unit 135 maps the panoramic image onto the three-dimensional model by texture mapping by referring to the reference point information storage unit 129 based on the coordinate in the panoramic image and the three-dimensional coordinate of the reference point. The mapping unit 135 displays the three-dimensional model with texture to which the panoramic image is attached on the display unit 111. Moreover, the mapping unit 135 stores three-dimensional model data with texture in the memory card via the input and output unit 110.

Figure 13:
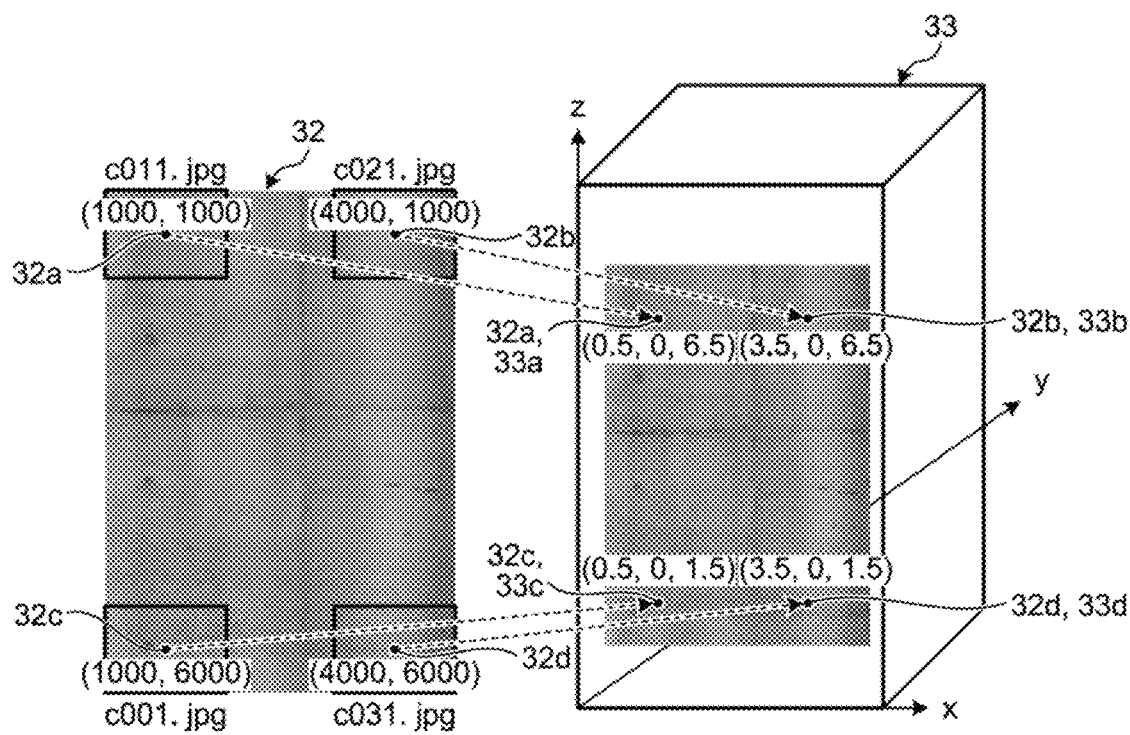
FIG. 13 is a diagram illustrating another example of texture mapping.

Here, texture mapping will be described with reference to FIG. 13. FIG. 13 is a diagram illustrating another example of texture mapping. As illustrated in FIG. 13, the mapping unit 135 maps the reference points of the four corners of the panoramic image 32 (that is, the central coordinates 32a to 32d of the first image) so as to correspond to the coordinates 33a to 33d corresponding to the reference points of the three-dimensional model 33. In the example of FIG. 13, the central coordinate 32a of the first image "c011.jpg" has a coordinate (1000, 1000) in the panoramic image. The mapping unit 135 maps the central coordinate 32a so as to correspond to the coordinate 33a corresponding to the reference point of the three-dimensional model 33 by referring to the reference point information storage unit 129 since the coordinate (1000, 1000) in the panoramic image corresponds to the three-dimensional coordinate (0.5, 0, 6.5). The mapping unit 135 maps the central coordinates 32b to 32d of the other four corners in the same manner. In this manner, the mapping unit 135 can map the panoramic image 32 onto the three-dimensional model 33.

Figure 14:
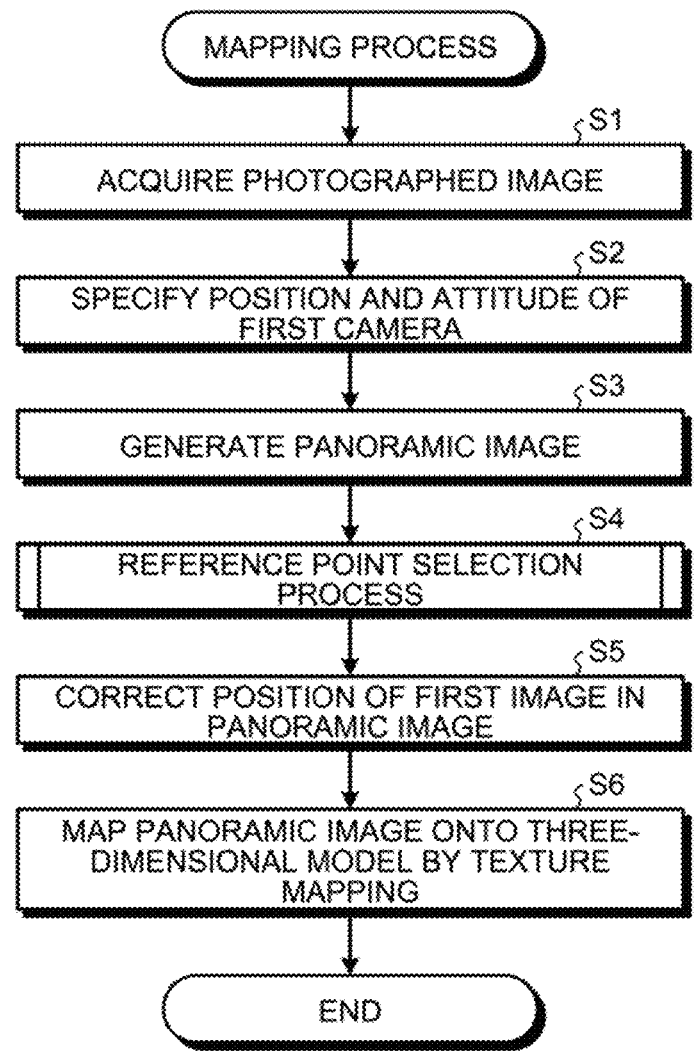
FIG. 14 is a flowchart illustrating an example of a mapping process according to an embodiment.

Next, the operation of the information processing system 1 of the embodiment will be described. FIG. 14 is a flowchart illustrating an example of a mapping process according to the embodiment.

When the image and the photographed time thereof are input from the first camera 12, the control unit 16 of the flying device 10 stores the input image and photographed time in the memory card of the input and output unit 14 as the first image and the photographed time thereof. Moreover, when an image and photographed time are input from the second camera 13, the control unit 16 stores the input image and photographed time in the memory card of the input and output unit 14 as the second image and the photographed time thereof.

The acquisition unit 131 of the information processing apparatus 100 acquires the first image and the photographed time thereof and the second image and the photographed time thereof (step S1). The acquisition unit 131 stores the acquired first image and the photographed time thereof in the first image storage unit 122. Moreover, the acquisition unit 131 stores the acquired second image and the photographed time thereof in the second image storage unit 123.

The specifying unit 132 estimates the position and attitude of the second camera 13 by executing a process of estimating the self-position using the three-dimensional model and the second image by referring to the three-dimensional model storage unit 121 and the second image storage unit 123. Moreover, the specifying unit 132 extracts the feature points of the second image with respect to the estimated position and attitude of the second camera 13 and assigns reliability based on the extracted feature points. The specifying unit 132 stores the estimated position and attitude of the second camera 13 and the reliability thereof in the second position and attitude storage unit 125.

Subsequently, the specifying unit 132 specifies the position and attitude of the first camera 12 and the reliability thereof by referring to the first image storage unit 122, the second position and attitude storage unit 125, and the conversion parameter storage unit 126 (step S2). The specifying unit 132 stores the specified position and attitude of the first camera 12 and the reliability thereof in the first position and attitude storage unit 124 in correlation with the photographed time and the image file name of the first image.

When the specifying unit 132 has finished specifying the position and attitude of the first camera 12 and the reliability thereof, the generating unit 133 stitches the first images by referring to the first image storage unit 122 to generate a panoramic image (step S3). The generating unit 133 stores the generated panoramic image in the panoramic image storage unit 128.

Figure 15:
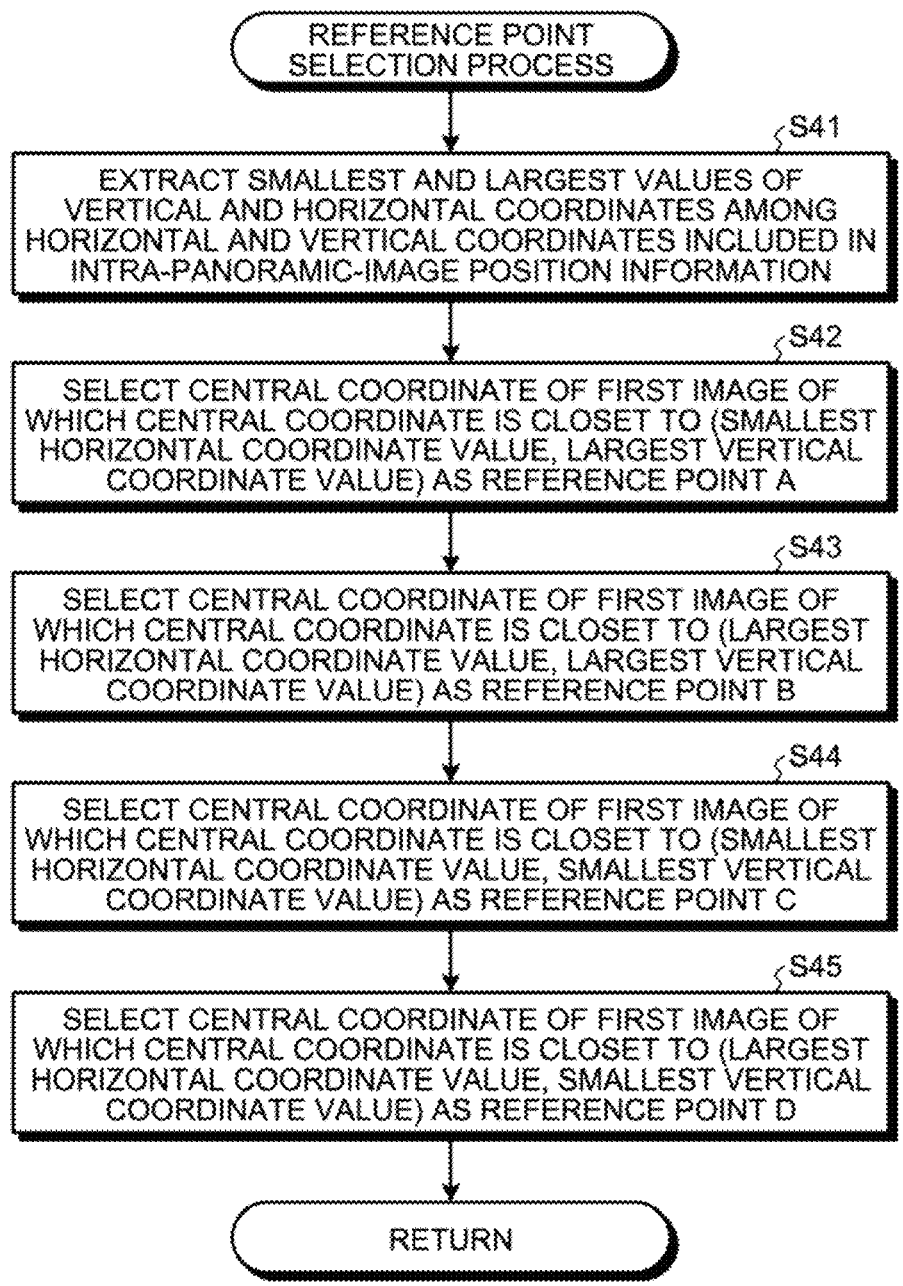
FIG. 15 is a flowchart illustrating an example of a reference point selection process.

When the panoramic image is generated, the correction unit 134 executes a reference point selection process of selecting the reference point to be used when attaching the panoramic image to the three-dimensional model (step S4). Here, the reference point selection process will be described with reference to FIG. 15. FIG. 15 is a flowchart illustrating an example of the reference point selection process.

The correction unit 134 extracts the smallest and largest values of the horizontal coordinate and the smallest and largest values of the vertical coordinate among the horizontal coordinates and the vertical coordinates included in the intra-panoramic-image position information by referring to the intra-panoramic-image position information storage unit 127 (step S41). The correction unit 134 selects the central coordinate of the first image of which the central coordinate is closest to (smallest horizontal coordinate value, largest vertical coordinate value) as the reference point A (step S42).

The correction unit 134 selects the central coordinate of the first image of which the central coordinate is closest to (largest horizontal coordinate value, largest vertical coordinate value) as the reference point B (step S43). The correction unit 134 selects the central coordinate of the first image of which the central coordinate is closest to (smallest horizontal coordinate value, smallest vertical coordinate value) as the reference point C (step S44). The correction unit 134 selects the central coordinate of the first image of which the central coordinate is closest to (largest horizontal coordinate value, smallest vertical coordinate value) as the reference point D (step S45). When the reference points A to D are selected, the correction unit 134 ends the reference point selection process and returns to the original process. In this way, the correction unit 134 can select the reference points in texture mapping.

Returning to FIG. 14, the correction unit 134 acquires the central coordinates corresponding to the respective first images selected as the reference points A to D and the position and attitude of the first camera 12 by referring to the first position and attitude storage unit 124 and the intra-panoramic-image position information storage unit 127. The correction unit 134 corrects the position of the first image in the panoramic image by correcting the position of the reference point based on the acquired position and attitude of the first camera 12 (step S5). The correction unit 134 stores the three-dimensional coordinates of the corrected reference points in the reference point information storage unit 129 in correlation with the coordinates in the panoramic image.

When the coordinates of the reference points in the panoramic image and the three-dimensional model are stored in the reference point information storage unit 129, the mapping unit 135 maps the panoramic image onto the three-dimensional model by texture mapping (step S6). The mapping unit 135 displays the three-dimensional model with texture to which the panoramic image is attached on the display unit 111. In this way, the information processing apparatus 100 can attach high-definition images to the three-dimensional model with high accuracy. Moreover, since the information processing apparatus 100 can estimate the position using images photographed by an omnidirectional camera, it is possible to acquire the photographed images using the flying device 10 of which the loading amount is limited. Moreover, since reliability is used for position estimation and the position information having low estimation accuracy is excluded, the information processing apparatus 100 can prevent misalignment of the position of the panoramic image (that is, texture).

In this manner, the information processing apparatus 100 acquires images photographed with the first angle of view and the second angle of view wider than the first angle of view. Moreover, the information processing apparatus 100 specifies the position and attitude of a camera that photographed the image photographed with the first angle of view based on the image photographed with the second angle of view. Furthermore, the information processing apparatus 100 generates a panoramic image by stitching a plurality of images photographed with the first angle of view. Furthermore, the information processing apparatus 100 corrects the position of the image photographed with the first angle of view on the generated panoramic image based on the specified position and attitude of the camera. Furthermore, the information processing apparatus 100 maps the panoramic image onto the three-dimensional model by texture mapping based on the corrected position. As a result, it is possible to attach high-definition images to the three-dimensional model with high accuracy.

The information processing apparatus 100 compares the central coordinates on the panoramic image, of the images photographed with the first angle of view, included in the panoramic image to extract the central coordinates of the images photographed with the first angle of view, positioned at the edges of the panoramic image as the reference points. Furthermore, the information processing apparatus 100 corrects the positions of the extracted reference points. As a result, it is possible to attach high-definition images to the three-dimensional model with high accuracy.

Moreover, the information processing apparatus 100 extracts feature points of the image photographed with the second angle of view and assigns reliability based on the extracted feature points to the specified position and attitude of the camera. Furthermore, the information processing apparatus 100 compares the central coordinates on the panoramic image, of the images photographed with the first angle of view, included in the panoramic image to extract the central coordinates of the images photographed with the first angle of view as the reference points based on the assigned reliability. Furthermore, the information processing apparatus 100 corrects the positions of the extracted reference points. As a result, since the position information having low estimation accuracy is excluded, it is possible to prevent misalignment of the position of texture.

The information processing apparatus 100 extracts the central coordinates of the images photographed with the first angle of view, positioned at the four corners of the panoramic image as the reference points and corrects the positions of the extracted reference points. As a result, it is possible to attach high-definition images to the three-dimensional model with high accuracy.

In the embodiment described above, although the first and second images are photographed using the flying device 10, the present invention is not limited to this. For example, the first and second cameras 12 and 13 may be provided at the end of a telescopic pole so as to photograph the first and second images while extending and retracting the pole.

In the embodiment described above, although the flying device 10 stores the first image and the photographed time thereof and the second image and the photographed time thereof in the memory card, the present invention is not limited to this. For example, the flying device 10 and the information processing apparatus 100 may be connected via radio communication and the first image and the photographed time thereof and the second image and the photographed time thereof may be transmitted from the flying device 10 to the information processing apparatus 100. In this way, it is possible to more quickly obtain the three-dimensional model to which the photographed image of the surface of the structure is attached.

In the embodiment described above, although a bridge having flat surfaces has been described as an example of the photographic target structure, the present invention is not limited to this. For example, geometric correction may be performed on a curved surface of a bridge having a columnar pier to attach photographed images.

In the embodiment described above, although a vertical surface has been described as an example of a surface of the photographic target structure, the present invention is not limited to this. For example, the present invention can be applied to a horizontal surface such as a girder of a bridge or a floorboard.

The components of each unit illustrated in the drawings do not always need to be physically configured in the manner illustrated in the drawings. In other words, specific forms of distribution and integration of the components are not limited to those illustrated in the drawings, and all or part of the components may be functionally or physically distributed or integrated in arbitrary units depending on various loads or use conditions. For example, the correction unit 134 and the mapping unit 135 may be integrated. Moreover, the illustrated respective processes are not limited to the order described above, but may be performed simultaneously within a range where the processing contents do not conflict and may be performed in different orders.

Various processing functions performed by each device may be implemented by a CPU (or a microcomputer, such as a MPU or a micro controller unit (MCU)) so that the CPU executes all or any part of the functions. Moreover, various processing functions may be implemented by a program analyzed and executed by the CPU (or a microcomputer such as an MPU or an MCU) or hardware using wired logic so that the CPU or the hardware executes all or any part of the functions.

Figure 16:
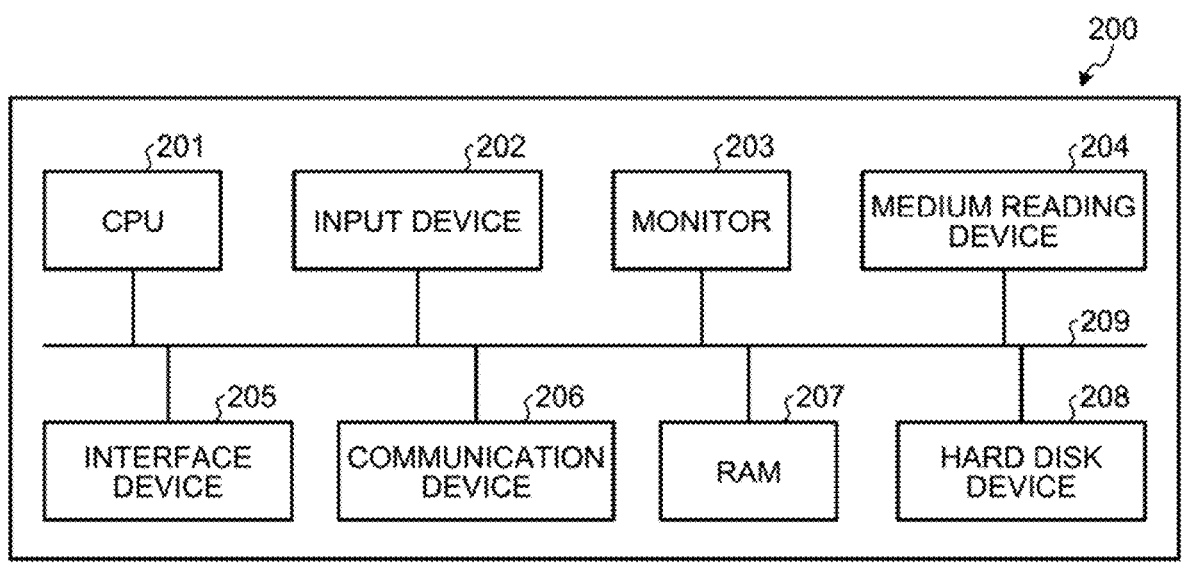
FIG. 16 is a diagram illustrating an example of a computer that executes an information processing program.

Various processes described in the above-described embodiment may be realized by a computer executing a predetermined program. Therefore, an example of a computer that executes a program having the same functions as the above-described embodiment will be described. FIG. 16 is a diagram illustrating an example of a computer that executes an information processing program.

As illustrated in FIG. 16, a computer 200 includes a CPU 201 that executes various arithmetic processes, an input device 202 that receives data input, and a monitor 203. The computer 200 further includes a medium reading device 204 that reads a program or the like from a storage medium, an interface device 205 for connecting to various devices, and a communication device 206 for connecting to another information processing apparatus or the like via cables or wirelessly. The computer 200 further includes a RAM 207 that temporarily stores various items of information and a hard disk device 208. The devices 201 to 208 are connected to a bus 209.

The hard disk device 208 stores an information processing program having the same functions as the processing units including the acquisition unit 131, the specifying unit 132, the generating unit 133, the correction unit 134, and the mapping unit 135 illustrated in FIG. 1. The hard disk device 208 further stores the three-dimensional model storage unit 121, the first image storage unit 122, the second image storage unit 123, the first position and attitude storage unit 124, and the second position and attitude storage unit 125. The hard disk device 208 further stores various items of data for implementing the conversion parameter storage unit 126, the intra-panoramic-image position information storage unit 127, the panoramic image storage unit 128, the reference point information storage unit 129, and the information processing program. The input device 202 receives the input of various items of information such as operation information from the user of the computer 200, for example. The monitor 203 displays various screens such as an output screen to the user of the computer 200, for example. The medium reading device 204 reads the first image and the photographed time thereof and the second image and the photographed time thereof from a storage medium such as a memory card. The interface device 205 is connected to a printing device or the like, for example. The communication device 206 is connected to a network (not illustrated), for example, to exchange various items of information with another information processing apparatus.

The CPU 201 reads programs stored in the hard disk device 208, loads the programs into the RAM 207, and executes the programs to perform various processes. These programs allow the computer 200 to function as the acquisition unit 131, the specifying unit 132, the generating unit 133, the correction unit 134, and the mapping unit 135 illustrated in FIG. 1.

The information processing program does not always need to be stored in the hard disk device 208. For example, the computer 200 may read and execute a program stored in a storage medium readable by the computer 200. Examples of the storage medium readable by the computer 200 include a portable recording medium such as a CD-ROM, a DVD disc, or a USB memory, a semiconductor memory such as a flash memory, and a hard disk drive. Moreover, the information processing program may be stored in devices connected to a public line, the Internet, a LAN, or the like and the computer 200 may read the information processing program from the devices and execute the information processing program.

High-definition images can be attached to a three-dimensional model with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   acquiring a plurality of high-definition images photographed multiple times by a first camera with a first angle of view and wide-viewing-angle images photographed by a second camera that is an omnidirectional camera with a second angle of view wider than the first angle of view;
   specifying a position and an attitude of the first camera that photographed the images photographed with the first angle of view based on the images photographed with the second angle of view by the second camera;
   stitching the plurality of images photographed with the first angle of view to generate a panoramic image;
   comparing central coordinates on the panoramic image, of the images photographed with the first angle of view, included in the panoramic image to extract the central coordinates of the images photographed with the first angle of view, positioned at edges of the panoramic image as reference points and correcting positions of the extracted reference points; and
   mapping the panoramic image to a three-dimensional model by texture mapping based on the corrected position.

2. The non-transitory computer-readable recording medium according to claim 1, wherein
   the specifying involves extracting feature points of the image photographed with the second angle of view and assigning reliability based on the extracted feature points to the specified position and attitude of the first camera, and
   the central coordinates of the images photographed with the first angle of view are extracted based on the assigned reliability.

3. The non-transitory computer-readable recording medium according to claim 1, wherein
   the correcting involves extracting central coordinates of the images photographed with the first angle of view, positioned at four corners of the panoramic image as reference points and correcting positions of the extracted reference points.

4. An information processing method implemented by a computer, the information processing method comprising:
   acquiring a plurality of high-definition images photographed multiple times by a first camera with a first angle of view and wide-viewing-angle images photographed by a second camera that is an omnidirectional camera with a second angle of view wider than the first angle of view, using a processor;
   specifying a position and an attitude of the first camera that photographed the images photographed with the first angle of view based on the images photographed with the second angle of view, using the processor;
   stitching the plurality of images photographed with the first angle of view to generate a panoramic image, using the processor;
   comparing central coordinates on the panoramic image, of the images photographed with the first angle of view, included in the panoramic image to extract the central coordinates of the images photographed with the first angle of view, positioned at edges of the panoramic image as reference points and correcting positions of the extracted reference points, using the processor; and
   mapping the panoramic image to a three-dimensional model by texture mapping based on the corrected position, using the processor.

5. The information processing method according to claim 4, wherein
   the specifying involves extracting feature points of the image photographed with the second angle of view and assigning reliability based on the extracted feature points to the specified position and attitude of the first camera, and
   the central coordinates of the images photographed with the first angle of view are extracted based on the assigned reliability.

6. The information processing method according to claim 4, wherein
   the correcting involves extracting central coordinates of the images photographed with the first angle of view, positioned at four corners of the panoramic image as reference points and correcting positions of the extracted reference points.

7. An information processing apparatus comprising:
   a memory; and
   a processor coupled to the memory, wherein the processor executes a process comprising:
   acquiring a plurality of high-definition images photographed multiple times by a first camera with a first angle of view and wide-viewing-angle images photographed by a second camera that is an omnidirectional camera with a second angle of view wider than the first angle of view;

specifying a position and an attitude of the first camera that photographed the images photographed with the first angle of view based on the images photographed with the second angle of view;

stitching the plurality of images photographed with the first angle of view to generate a panoramic image;

comparing central coordinates on the panoramic image, of the images photographed with the first angle of view, included in the panoramic image to extract the central coordinates of the images photographed with the first angle of view, positioned at edges of the panoramic image as reference points and correcting positions of the extracted reference points; and mapping the panoramic image to a three-dimensional model by texture mapping based on the corrected position of the image photographed with the first angle of view.

8. The information processing apparatus according to claim 7, wherein the specifying involves extracting feature points of the image photographed with the second angle of view and assigns reliability based on the extracted feature points to the specified position and attitude of the first camera, and the central coordinates of the images photographed with the first angle of view are extracted based on the assigned reliability.

9. The information processing apparatus according to claim 7, wherein the correcting involves extracting central coordinates of the images photographed with the first angle of view, positioned at four corners of the panoramic image as reference points and corrects positions of the extracted reference points.

* * * * *